United States Patent
Katz et al.

(10) Patent No.: US 7,476,696 B2
(45) Date of Patent: Jan. 13, 2009

(54) REDUCTION IN POLYSTYRENE FOAMS WITH LOW VAPOR PRESSURE DIBASIC ESTERS

(75) Inventors: Harvey Katz, Boca Raton, FL (US); Claudia A. Iovino, Boca Raton, FL (US)

(73) Assignee: Blue Earth Solutions, Inc., Clermont, FL (US)

( * ) Notice: Subject to any disclaimer, the term of this patent is extended or adjusted under 35 U.S.C. 154(b) by 0 days.

(21) Appl. No.: 11/205,143

(22) Filed: Aug. 17, 2005

(65) Prior Publication Data

US 2006/0229422 A1    Oct. 12, 2006

Related U.S. Application Data

(60) Provisional application No. 60/668,597, filed on Apr. 6, 2005.

(51) Int. Cl.
*C08J 11/04* (2006.01)
(52) U.S. Cl. ........................... 521/40.5; 521/47
(58) Field of Classification Search ............... 521/40.5, 521/47

See application file for complete search history.

(56) References Cited

U.S. PATENT DOCUMENTS 6,403,661 B1 *   6/2002   Usui et al. .................... 521/47

* cited by examiner

*Primary Examiner*—Edward J Cain
(74) *Attorney, Agent, or Firm*—Fellers, Snider, Blankenship, Bailey & Tippens, P.C.; Scott R. Zingerman

(57) ABSTRACT

The present invention relates to a foam reduction agent comprising low vapor pressure dibasic esters and a method of using a liquid to contact with polystyrene foam wherein the higher boiling temperature of the low vapor pressure dibasic esters and contact with the liquid provides a volume reduction process and less evaporation loss as well as safer transportation of the chemicals and the polystyrene in its reduced state. The resulting reduced sludge is also recyclable to superior quality raw polystyrene foam beads and the reduction agents are recoverable for future use. The resulting sludge also has unexpected beneficial uses heretofore unknown as a waterproofing agent, a paint stripper, as a graffiti remover, as an extender of the life of concrete, as an adhesive remover, as a stain remover, as a scuff mark remover, and as a general degreaser.

32 Claims, No Drawings

US 7,476,696 B2

REDUCTION IN POLYSTYRENE FOAMS WITH LOW VAPOR PRESSURE DIBASIC ESTERS

FIELD OF THE INVENTION

This invention provides novel chemical agents to reduce polystyrene foam plastics to a compact form using a low vapor pressure dibasic ester-based chemical agent in liquid form which reduces the polystyrene foam to a sludge-like material that is safe to ship and greatly reduces its volume of waste.

BACKGROUND OF THE INVENTION

Polystyrene foam has been used for some time as packing material, insulation material, structural materials and other various uses. Polystyrene foams exhibit many useful qualities in a wide variety of fields. The foams usefulness is based partly on its cost effectiveness, its inherent insulating qualities and the ease with which it may be formed into a great variety of shapes. For instance, the food handling industry has found polystyrene foam packaging to be of great use in the packaging of food products for its consumers. In addition, the building industry has found a large variety of uses for the foam. The chief concern for the various uses of the foam has been the amount of waste that is generated by the use of polystyrene foam products.

Generally speaking, polystyrene foam has primarily caused great concern because of its lack of biodegradability. The foam by its very nature takes up a great deal of volume per weight, which has caused many individuals to question its overall commercial usefulness when compared to the overall possible detrimental environmental impact. The environmental impact includes the accelerated rate that landfill space is being used up at because the foam, in its useful form, takes a large amount of space per weight of waste. Moreover, the transportation of the foam waste is very inefficient due to the volume weight ratio. Typically, the waste material is transported from a restaurant facility to a waste area. This transportation usually involves motor vehicle transport. The vehicles can transport a much greater weight of refuse than can be placed in the vehicle due to the large volume the polystyrene foam takes up. Therefore, the transportation of polystyrene foam products in general is very inefficient because the full capacity of the shipping means is not utilized.

Also, in the industry it has been very difficult to find an effective method of recycling the polystyrene foam products. This is due in part to the shipping cost described above and the cost of the process of the actual recycling. There is a therefore a continued need for a polystyrene foam volume reduction method to allow use of more conventional plastic recycling and processing equipment. At the present, very expensive and specialized processing equipment and extra polystyrene foam compaction steps are required to recycle polystyrene foam products.

One approach to the recycling of polystyrene foam is to use chemicals to reduce the foam. The basic problem in the industry, however, is that the chemicals that are often considered the most obvious to use are very toxic to the environment with the result that they are often banned by environmental legislation or regulations. One chemical series, pinene and terpenes such as d-limonene can reduce the foam volume. This approach is interesting but unfortunately it fails to be an effective method in some cases. Specifically, the cost of d-limonene is directly related to the crop levels of citrus products. Accordingly, when there is a problem with the production of citrus-based products due to bad growing conditions, it directly effects the price to recycle foam products to the point where it may no longer be cost effective.

Moreover, prior approaches evidence an inconsistent activity in collapsing polystyrene foams that has not previously been addressed in the industry. For example, while heat activation of the terpenes has removed this problem (U.S. Pat. No. 5,223,543, the entire contents of which are incorporated herein by reference), it adds to the overall cost of recycling and it involves a volatile environmentally compromising chemical. The chemicals used in the '543 patent were problematic for shipping due to their flash point. They are highly volatile and therefore extra precautions have to be taken when shipping such products that ultimately make use of such chemicals cost-ineffective. Moreover, the process used in the '543 patent was basically vapor phase, providing for possible emissions of vapors which were a Clean Air Act Problem. Thus there continues to be a major need for a polystyrene foam reduction process that uses low volatility agents.

Also, the use of volatile chemicals presents another problem for the recycling efforts of polystyrene foam products. The chemicals used heretofore suffer great loss in the recycling process due to evaporation. This makes the recycling materials vary hard to recover to be used again in the recycling process. As such, it greatly increases the cost to the recycling efforts. The evaporated chemicals would also potentially increase the danger of an accident during the recycling process due to unacceptable flash points of the chemicals. This is especially true were the best performance of the chemicals is aided by the application of heat to the recycling process. Ultimately, the volatile chemicals and heat required lead to conditions during the recycling process that are potentially very dangerous.

An ideal process would have little need for the heat activation step of U.S. Pat. No. 5,223,543 and would further allow viscous and higher boiling point materials to be employed. Ideally, these materials would not require longer residence times prior to recycling. A long time would delay the sequence of breaking down the polystyrene foam products and shipping of same. This increase in residence times adds to the overall cost of the recycling process. Also, the need to decrease residence time must be balanced with reduced heat activation in combination with higher boiling point materials whose combination would result in a heretofore unobtainable efficient and safe chemical reactant. In addition, it would be most desirable to have the product or sludge of the polystyrene foam collapsing reactions safely shippable. It would also be advantageous to identify effective compounds that insulate the polystyrene foam reducer market from the wide price variation of the orange crop related d-limonene market.

Also, it would be desirable to have a compound that is environmentally friendly. Part of the major problem with the past use of foam products is that they now occupy a great deal of space in our landfills. Therefore, there is a significant need for an agent that can be used at these landfills on foam, which has already been deposited into landfills. The only way to accomplish this is by the application of a foam reducing agent that has no detrimental side effects on the environment.

In a prior effort to address some of these needs, Katz et al. were recently issued U.S. Pat. No. 6,743,828 which is directed to a polystyrene foam reduction agent consisting of dibasic esters and a process using a liquid contact with polystyrene foam wherein the higher boiling temperature of the dibasic esters and contact with the liquid provides a volume reduction process and less evaporation loss as well as safer transportation of the chemicals and the polystyrene in its reduced state. The foam reduction agent consisting of dibasic esters and the process employed results in a reduced sludge that is also recyclable to superior quality raw polystyrene foam beads and the reduction agents are recoverable for future use.

Notwithstanding the usefulness of the prior polystyrene foam reduction recycling systems using dibasic or dialkyl esters, there is a continuing need in the art to develop other more versatile polystyrene foam reduction recycling systems to enhance the efficiency and full range of recycling possibilities. This invention solves these and other long felt needs by providing compositions and methods utilizing low vapor pressure dibasic esters or functional derivatives thereof in a polystyrene foam reduction recycling system.

SUMMARY OF THE INVENTION

In general, the present invention is directed to novel polystyrene foam reduction recycling compositions and methods that solve the volume problem of recycling polystyrene foam materials while simultaneously allowing the easy and inexpensive shipment of the foamed materials after reduction in volume by use of a novel low vapor pressure dibasic ester composition (hereinafter, LVP-DBE). The methods of the present invention are applicable to all types of expanded or foamed polysyrene materials known to those of skill in the art.

In one aspect, the present invention provides a novel polystyrene foam reduction recycling system comprising a composition of LVP-DBE comprising dimethyl glutarate [CAS #1119-40-0] and dimethyl adipate [CAS #627-93-0]. In one embodiment, the novel polystyrene foam reduction recycling system of the present invention further comprises a composition of LVP-DBE comprising dimethyl glutarate [CAS #1119-40-0], dimethyl adipate [CAS #627-93-0] and dimethyl succinate (CAS #106-65-0), wherein the weight percentage of dimethyl succinate is 1% and less. For example, and not by way of limitation, 1.0%, 0.9%, 0.8%, 0.7%, 0.6%, 0.5%, 0.4%, 0.3%, 0.2%, 0.1%, and any numerical values there between are specifically permitted for use in the polystyrene foam reduction recycling system of the present invention. Other LVP-DBE-based compositions that may be used in the novel polystyrene foam reduction recycling system of the present invention include LVP-DBE-2, LVP-DBE-3, LVP-DBE-5, LVP-DBE-6, and LVP-DBE-1B as specifically set forth in Table 1.

Specifically excluded within the scope of the polystyrene foam reduction recycling system of the present invention is the use of non-low vapor pressure DBE. Also specifically excluded within the scope of the polystyrene foam reduction recycling system of the present invention is the use of DBE, DBE-4, and DBE-9 as specifically set forth in Table 1. Also specifically excluded within the scope of the polystyrene foam reduction recycling system of the present invention is the use of dimethyl succinate (CAS #106-65-0) in weight percentage amounts greater than 1%.

In one embodiment, the percentage of dimethyl glutarate in the LVP-DBE composition of the present invention is in the range of between about 5% and about 98% weight percent. In one embodiment, the percentage of dimethyl adipate in the LVP-DBE composition of the present invention is in the range of between about 20% and about 98.5% weight percent. In one embodiment, the percentage weight of total diesters in the LVP-DBE composition of the present invention is at least 98.5% weight percent, with an average weight percentage of approximately 99.4-99.7%. It is intended herein that the ranges recited also include all those specific percentage amounts between the recited range. For example, the range of about 20 to 98.5% also encompasses 21 to 97.5% weight percent, 22 to 98.5% weight percent, 21 to 96.5% weight percent, etc., without actually reciting each specific range therewith. In another embodiment, the percentage of dimethyl glutarate in the LVP-DBE composition of the present invention is in the range of between about 2% and about 40% weight percent and the percentage of dimethyl adipate in the LVP-DBE composition of the present invention is in the range of between about 10% and about 50% weight percent.

In yet another aspect, the present invention provides a novel polystyrene foam reduction recycling system comprising a composition of LVP-DBE that exhibits a significantly lower vapor pressure than standard DBE. In one embodiment, the lower vapor pressure exhibited by the LVP-DBE composition of the present invention is in the range of between about 0.01 to about 0.001 mm Hg @ 20° C. (68° F.), compared to the vapor pressure of standard DBE which is in the range of between about 0.10 to about 0.02 mm Hg @ 20° C. (68° F.). Such lower vapor pressure is important because it translates into a healthier work environment and a lower inhalation risk for potential users and recyclers. The lower vapor pressure also minimizes any apparent odor in the work area for users and recyclers.

In yet another aspect, the present invention provides a novel polystyrene foam reduction recycling system comprising a composition of LVP-DBE that exhibits a significantly lower vapor pressure than standard DBE, which LVP-DBE meets the low vapor pressure criteria established by the California Air Resources Board for volatile organic compounds in consumer products per California Code of Regulations, Title 17, Division 3, Chapter 1, Subchapter 8.5, Article 2, Section 94508(a) 80(A), the entire contents of which are incorporated herein by reference.

In yet another aspect, the present invention provides a novel polystyrene foam reduction recycling system comprising a composition of LVP-DBE that exhibits a significantly lower vapor pressure than standard DBE, which LVP-DBE meets the exemption criteria for consumer products per EPA 40CFR59.203(f)1, the entire contents of which are incorporated herein by reference.

In one embodiment, the novel polystyrene foam reduction recycling system of the present invention further comprises a two component composition of LVP-DBE that provides simplified distillation or other recycling methods.

In yet another embodiment, the novel polystyrene foam reduction recycling system of the present invention comprises a three component composition of LVP-DBE in which the distillation range of the solvent used to reduce the polystyrene or EPS is unexpectedly narrower than that found in U.S. Pat. No. 6,743,828. Such narrower distillation ranges result in lower equipment costs, better control and lower production and use costs. In one embodiment, the distillation range of the solvent of the LVP-DBE composition of the present invention is in the range of between about 210 to about 225° C. (about 410 to about 437° F.), compared to the distillation range of the solvent of standard DBE which is in the range of between about 196 to about 225° C. (about 385 to about 437° F.). The unexpectedly narrower distillation range of the solvent of the LVP-DBE composition serves to narrow down the boiling range by over 9%. Thus, the range can now be narrowed to reflect the closer boiling point which will result in a better polystyrene bead. By use of a higher heat ratio in the LVP-DBE polygel, breakdown of the LVP-DBE will not occur as easily.

In yet another aspect, the present invention provides a novel polystyrene foam reduction recycling system comprising a LVP-DBE composition that is chemically more stable than standard DBE. Since the vapor pressure of the LVP-DBE is lower, the polystyrene product is more stable and has certain properties that make LVP-DBE a better choice to use in a given work place. For example, in one embodiment, the LVP-DBE composition will not remove paint or adhesives as quickly as standard DBE.

In yet another aspect, the present invention provides a novel polystyrene foam reduction recycling system comprising a LVP-DBE composition that is incompatible or can react with, inter alia, strong oxidizers, acids, alkalies, etc.

In yet another aspect, the present invention provides a novel polystyrene foam reduction recycling system comprising a LVP-DBE composition that will not undergo polymerization.

In yet another aspect, the present invention provides a novel polystyrene foam reduction recycling system comprising a LVP-DBE composition that reduces foamed polystyrene at a rate of action that equals or exceeds that of standard DBE. Thus, in one embodiment, in outdoor conditions when the temperature is warm, the lower vapor pressure DBE will not evaporate as quickly and therefore will be more effective in reducing expanded polystyrene foam (EPS).

In yet another aspect, the present invention provides a novel polystyrene foam reduction recycling system comprising a LVP-DBE composition that exhibits a greater holding capacity than standard DBE. In one embodiment, such greater holding capacity at ambient temperature approaches approximately 55%—approximately 75% of polystyrene with the remainder being solvent (LVP-DBE), whereas the holding capacity for a polystyrene foam reduction recycling system using standard DBE approaches approximately 0-50%. Such greater holding capacity is demonstrated by virtue of the lower viscosity of the solution at equal concentrations. This lower viscosity leads to a more cost effective use of the solvent as a more concentrated polygel can be produced which makes recycling of polystyrene foam more effective.

In yet another aspect, the present invention provides a novel polystyrene foam reduction recycling system comprising a LVP-DBE composition that exhibits a higher flash point than standard DBE. In one embodiment, the flash point of the LVP-DBE composition of the present invention is in the range of between about 102 to about 104° C. (about 216 to about 219° F.), compared to the flash point of standard DBE which is about 100° C. (about 212° F.). Such higher flash points leads to increased safety for the user and recycling process and will minimize transportation restrictions.

In yet another aspect, the present invention provides a novel polystyrene foam reduction recycling system comprising a LVP-DBE composition that is not regulated as a hazardous material by Department of Transportation (DOT), International Maritime Organization (IMO), or International Air Transport Association (IATA).

In yet another aspect, the present invention provides a novel polystyrene foam reduction recycling system comprising a LVP-DBE composition for which none of the components present in the LVP-DBE composition are listed by International Agency for Research on Cancer (IARC), National Transportation Program (NTP), Occupational Health and Safety Organization (OSHA) or American Conference of Industrial Hygienists (ACGIH) as a carcinogen In yet another aspect, the present invention provides a novel polystyrene foam reduction recycling system comprising a LVP-DBE composition that exhibits biodegradability as measured by the 28-day closed bottle test. The LVP-DBE composition was tested for biodegradability using the 28-day closed bottle test. A minimum of 60% biodegradation must be reached in a 14 day window after exceeding the 10% level in order to pass this test and be rated as readily biodegradable. All of the components of the recycling system of the present invention pass this test and, therefore, DBE-LVP is considered readily biodegradable. In one embodiment, the biodegradability of the dimethyl glutrate in the LVP-DBE composition of the present invention is in the range of between about 70% at day 7 and about 84% at day 14%. In one embodiment, the biodegradability of the percentage of dimethyl adipate in the LVP-DBE composition of the present invention is in the range of between about 58% at day 7 and about 84% at day 14. In one embodiment, the biodegradability of the dimethyl succinate in the LVP-DBE composition of the present invention is in the range of between about 80% at day 7 and about 90% at day 22.

In yet another aspect, the present invention provides a novel polystyrene foam reduction recycling system comprising a LVP-DBE composition that exhibits one or more of the following characteristics: (a) a significantly lower vapor pressure than standard DBE, (b) the distillation range of the solvent is narrower, (c) chemically more stable than standard DBE, (d) that is incompatible or can react with, inter alia, strong oxidizers, acids, alkalies, etc., (e) that will not undergo polymerization, (f) that reduces foamed polystyrene at a rate of action that equals or exceeds that of standard DBE, (g) that exhibits a greater holding capacity than standard DBE, (h) that exhibits a higher flash point than standard DBE, (i) that is not regulated as a hazardous material by DOT, IMO, or IATA, and (j) for which none of the components present in the LVP-DBE composition are listed by IARC, NTP, OSHA or ACGIH as a carcinogen.

In yet another aspect, the invention relates, in part, to a novel polystyrene foam reduction recycling system comprising exposing said foams to liquid sprays of specific esters exhibiting one or more of the aforementioned characteristics.

In yet another aspect, the invention relates, in part, to a novel polystyrene foam reduction recycling system comprising exposing said foams to liquid sprays of specific esters comprising dimethyl glutarate [CAS #1119-40-0] and dimethyl adipate [CAS #627-93-0], wherein the ester specifically excludes dimethyl succinate in weight percentage amounts greater than 1%, and wherein said esters exhibit one or more of the aforementioned characteristics.

In yet another aspect, the invention relates, in part, to a novel polystyrene foam reduction recycling system comprising exposing said foams to liquid sprays of specific esters, wherein the ester is selected from the group consisting of dimethyl glutarate [CAS #1119-40-0] and dimethyl adipate [CAS #627-93-0], wherein the esters specifically exclude dimethyl succinate in weight percentage amounts greater than 1%, and wherein said esters exhibit one or more of the aforementioned characteristics.

In yet another aspect, the invention relates, in part, to the novel use of LVP-DBE for polystyrene reduction that can be more effective if mixed with isopronol or terpenes such as, for example, and not by way of limitation d-limonene.

In yet another aspect, the invention relates, in part, to a novel polystyrene foam reduction recycling system comprising the steps of (a) exposing polystyrene foam in a container to a solution of specific esters comprising dimethyl glutrate [CAS #1119-40-0] and dimethyl adipate [CAS #627-93-0], wherein the esters specifically exclude dimethyl succinate in weight percentage amounts greater than 1%; (b) covering said container; and (c) supplementing polystyrene foam until maximum reduction is achieved.

In one embodiment, the polystyrene foam may be shredded or grinded prior to exposure to the aforementioned specific ester combination using any mechanical apparatus known to those of skill in the art for shredding or grinding polystyrene foam. By converting the polystyrene foam into smaller fragments, a greater surface area for exposure to the specific ester combination is provided thereby affording faster polystyrene foam reduction.

In another embodiment, the polystyrene foam may be shredded or grinded prior to exposure to the specific esters combination using any mechanical apparatus and the specific ester combination is then applied using a solvent spraying unit physically connected to the mechanical apparatus. In this embodiment, a container may be placed under the apparatus to collect the reduced sprayed polystyrene foam.

In yet another embodiment, the polystyrene foam may be shredded or grinded prior to exposure to the specific esters combination using any mechanical apparatus and the specific ester combination is then applied using a hand held solvent spraying unit.

In yet another aspect, the LVP-DBE composition of the present invention is useful for rendering organic polymeric coatings and finishes such as paints, varnishes, lacquers, shellacs, gums, natural and synthetic resins removable from a wide range of coatings and surfaces such as, for example, and not by way of limitation, wood, metal, and plastic. An important feature of the composition is that it provides excellent results without the need of evaporation retardants or film-forming compounds. Thus, there is no need to include in the formulation such evaporation retardants as paraffin wax or the like, which have the disadvantage that they need to be removed in subsequent processing steps. Another feature of the composition of the present invention is that it has a shelf life in excess of about one year to about 10 years.

Thus, in yet another aspect, the invention relates, in part, to the novel use of the LVP-DBE composition of the present invention as a paint stripper.

In yet another aspect, the invention relates, in part, to the novel use of the LVP-DBE composition of the present invention as a graffiti remover.

In yet another aspect, the invention relates, in part, to the novel use of the LVP-DBE composition of the present invention as a water proofing agent that may be applied via spray means or brush on means.

In yet another aspect, the invention relates, in part, to the novel use of the LVP-DBE composition of the present invention for removing paints, inks, grease, and the like from skin.

In yet another aspect, the invention relates, in part, to the novel use of the LVP-DBE composition of the present invention as an extender of the life of concrete by mixing in a minimum of 1.5% of the composition (the reduced polystyrene) but not to exceed 27.5% of the composition.

In yet another aspect, the invention relates, in part, to the novel use of the LVP-DBE composition of the present invention as an adhesive remover.

In yet another aspect, the invention relates, in part, to the novel use of the LVP-DBE composition of the present invention as a tar remover.

In yet another aspect, the invention relates, in part, to the novel use of the LVP-DBE composition of the present invention as a stain remover.

In yet another aspect, the invention relates, in part, to the novel use of the LVP-DBE composition of the present invention as a scuff mark remover.

In yet another aspect, the invention relates, in part, to the novel use of the LVP-DBE composition of the present invention as a general degreaser.

Other preferred embodiments of the invention will be apparent to one of ordinary skill in the art in light of what is known in the art, in light of the following drawings and description of the invention, and in light of the claims.

BRIEF DESCRIPTION OF THE DRAWINGS/FIGURES

There are no drawings for this application.

DETAILED DESCRIPTION OF THE INVENTION

This invention reveals a method to provide rapid destruction of the cells of polystyrene foams by use of a combination of specific chemicals of the class of aliphatic dibasic esters, either alone or with other foam reduction agents and surfactants that are active and which readily attack, with no or little heat activation, polystyrene foam and allows easy recycling. The easy recycling is due to reduced bulk and ease of storage of the collapsed polystyrene foam in sludge foam, ease of processing, and economical transportation prior to recycling. The collapsed polystyrene foam may be easily and safely transported.

The method of the present invention involves the exposure of said foams to liquid sprays of specific esters comprising LVP-DBEs that exhibit one or more of the following characteristics: (a) a significantly lower vapor pressure than standard DBE, (b) the distillation range of the solvent is narrower, (c) chemically more stable than standard DBE, (d) that is incompatible or can react with, inter alia, strong oxidizers, acids, alkalies, etc., (e) that will not undergo polymerization, (f) that reduces foamed polystyrene at a rate of action that equals or exceeds that of standard DBE, (g) that exhibits a greater holding capacity than standard DBE, (h) that exhibits a higher flash point than standard DBE, (i) that is not regulated as a hazardous material by DOT, IMO, or IATA, and (O) for which none of the components present in the LVP-DBE composition are listed by IARC, NTP, OSHA or ACGIH as a carcinogen. Examples of DBE dibasic esters are known to those of skill in the art and include for example, and not by way of limitation, those listed in Table 1 infra.

In addition to the aforementioned list of properties for the LVP-DBE composition of the present invention, the specific properties of each of the LVP-DBE-2, LVP-DBE-3, LVP-DBE-5, LVP-DBE-6, and LVP-DBE-1B DBE Dibasic Ester compositions as specifically set forth in Table 1 infra are also included as if specifically set forth herein, including for example, and not by way of limitation, ester content (wt. %, min.), water content (wt. %, max.), acid number, mg KOH/g, max., color, APHA, max., turbidity, max., methanol, wt %, isobutanol, wt %, molecular weight, specific gravity at 20/20° C., density at 20° C. (lb/gal), distillation range, ° C., vapor pressure at 20° C. (mm Hg), solubility in water, wt % at 20° C., water solubility in DBE, wt % at 20° C., freezing point, ° C., flashpoint, Tag closed cup, ° C., auto ignition temperature, ° C., latent heat of vaporization, cal/g, viscosity at 25° C., cst, and properties of the solvent including, for example, and not by way of limitation, non-polar, polar, hydrogen bonding, surface tension at 20° C., dynes/cm, and electrical resistance at 24° C., Meg Ohms.

The above-listed characteristics, as well as any other characteristics provided in Table 1 infra, confer superior and unexpected results, properties, and advantages to the LVP-DBE composition for its use in the polystyrene foam reduction recycling system of the present invention compared to the standard DBE composition as used in U.S. Pat. No. 6,743,828. The aforementioned features and benefits of using the LVP-DBE composition of the present invention translate into a stronger commitment for more responsible stewardship of the environment and provide an excellent example of the concept of closed-loop recycling.

TABLE 1

| | DBE Dibasic Esters | | | | | | | |
|---|---|---|---|---|---|---|---|---|
| | DBE | DBE-2 | DBE-3 | DBE-4 | DBE-5 | DBE-6 | DBE-9 | DBE-IB |
| Specification | | | | | | | | |
| Ester content, wt. %, min. | 99.0 | 99.0 | 99.0 | 98.5 | 99.0 | 99.0 | 99.0 | 98.5 |
| Water content, wt. %, max. | 0.10 | 0.10 | 0.20 | 0.04 | 0.10 | 0.05 | 0.10 | 0.1 |
| Acid number, mg KOH/g, max. | 0.30 | 1.00 | 1.00 | 0.50 | 0.50 | 1.00 | 0.50 | 1.00 |
| Dimethyl adipate, wt % | 10-25 | 20-28 | 85-95 | 0.1 max. | 0.2 max. | 98.5 min. | 0.3 max. | 10-20[f] |
| Dimethyl glutarate, wt % | 55-65 | 72-78 | 5-15 | 0.4 max. | 98.0 max. | 1.0 max. | 65-69 | 55-70[f] |
| Dimethyl succinate, wt % | 15-25 | 1.0 max. | 1.0 max. | 98.0 max. | 1.0 max. | 0.15 max. | 31-35 | 20-30[f] |
| Color, APHA, max | 15 max. | 15 max. | 15 max. | 15 max. | 15 max. | 15 max. | 15 max. | 15 max. |
| Turbidity, max. | 5 max. | 5 max. | 5 max. | 5 max. | 5 max. | 5 max. | 5 max. | 5 max. |
| Typical Composition | | | | | | | | |
| Ester content, wt. %, min. | 99.5 | 99.5 | 99.5 | 99.5 | 99.5 | 99.0 | 99.0 | 99.5 |
| Dimethyl adipate, wt % | 21 | 24 | 89 | — | 0.1 | 99 | 0.2 | 21[f] |
| Dimethyl glutarate, wt % | 59 | 75 | 10 | 0.3 | 99 | <0.5 | 66 | 59[f] |
| Dimethyl succinate, wt % | 20 | 0.3 | 0.2 | 98 | 0.4 | <0.1 | 33 | 20[f] |
| Methanol, wt % | 0.20 | <0.1 | <0.1 | <0.1 | <0.1 | <0.1 | <0.1 | N/A |
| Isobutanol, wt % | N/A | N/A | N/A | N/A | N/A | N/A | N/A | 0.2 |
| Water, wt % | 0.05 | 0.02 | 0.04 | 0.02 | 0.03 | 0.03 | 0.04 | 0.05 |
| Physical Properties (typical values) | | | | | | | | |
| Molecular Weight | 159[a] | 163[a] | 173[a] | 146 | 160 | 174 | 156[a] | 242 |
| Specific gravity at 20/20° | 1.092[c] | 1.081[c] | 1.068[c] | 1.121 | 1.091 | 1.064 | 1.099[c] | 0.958-0.960 |
| Specification | | | | | | | | |
| Density at 20° C. (lb/gal) | 9.09[c] | 9.00[c] | 8.89[c] | 9.33 | 9.08 | 8.86 | 9.18[c] | 7.97[c] |
| Distillation Range, ° C. | 196-225 | 210-225 | 215-225 | 196 | 210-215 | 227-230 | 196-215 | 275-295 |
| Vapor Pressure at 20° C. (mm Hg) | 0.20[c] | 0.04[c] | 0.02[c] | 0.13 | 0.05 | 0.01 | 0.07[c] | <0.01[c] |
| Solubility in water, wt % at 20° C. | 5.3 | 4.2 | 2.5 | 7.5 | 4.3 | 2.1 | ca. 5 | <0.1 |
| Water Solubility in DBE, wt % at 20° C. | 3.1 | 2.9 | 2.5 | 3.8 | 3.2 | 2.4 | ca. 3.5 | 0.6 |
| Freezing Point, ° C. | −20[c] | −13[c] | 8[c] | 19 | −37 | 10 | −10[c] | −55 |
| Flashpoint, Tag closed cup ° C. | 100 | 104 | 102 | 94 | 107 | 113 | 94 | 133 |
| Physical Properties (typical values) | | | | | | | | |
| Auto ignition temp., ° C. | 370 | 375 | 360 | 365 | 365 | 360 | 365 | >370 |
| Latent heat of vaporization, cal/g | 81 | 80 | 79 | 85 | 81 | 79 | 82 | N/A |
| Viscosity at 25° C., cst | 2.4 | 2.5 | 2.5 | 2.5 | 2.5 | 2.5 | 2.4 | 18.8 |
| Solvent Properties | | | | | | | | |
| non-polar[d] | 8.3 | 8.3 | 8.3 | 8.3 | 8.3 | 8.3 | 8.3 | 7.9 |
| polar[d] | 2.3 | 2.2 | 2.1 | 2.5 | 2.3 | 2.1 | 2.3 | 1.3 |

TABLE 1-continued

| | DBE Dibasic Esters | | | | | | | |
|---|---|---|---|---|---|---|---|---|
| | DBE | DBE-2 | DBE-3 | DBE-4 | DBE-5 | DBE-6 | DBE-9 | DBE-IB |
| hydrogen bonding[d] | 4.8 | 4.7 | 4.5 | 5.0 | 4.8 | 4.5 | 4.8 | 3.6 |
| Surface tension at 20° C., dynes/cm | 3.56 | N/A | N/A | N/A | N/A | N/A | N/A | 27.2 |
| Electrical Resistance[e] at 24° C., Meg Ohms | 0.5 | N/A | N/A | N/A | N/A | N/A | N/A | N/A |

[a]Average for mixture
[b]Äsp. Gr./ÄT = −0.0007 per ° C. over the range 20-50° C.
[c]Approximate, based on composition
[d]Hansen Solubility Theory
[e]Ransberg Paint Resistance Tester Model 219CB
[f]Di-Isobutylester In one embodiment, terpenes, isopropanols can be added and the addition of any from the family of non-ionic surfactants will serve to raise the flash point. A representative example of a non-ionic surfactant would be NP 9 or the terpenes such as d-limonene, etc. Other foam reducing agents such as esters from celery, or other vegetables such as soybean, etc., or for example, olive oil, will work but prove to be inefficient on their own. In another embodiment, some of the above esters do not have a low flash point or have higher vapor pressure working in combination with LVP-DBE but will work in combination just as fast and in some case even at faster rates of reduction. In short, the addition of surfactants serves to help raise the boiling point of other solvents. All of the other compositions in the terpenes and isopropanols family have lower boiling points compared to both standard DBE and or LVP-DBE.

The term "surfactant" is used following the nomenclature system of the International Cosmetic Ingredient Dictionary, 5.sup.th ed., J. A. Wenninger et al. eds., The Cosmetic, Toiletry, and Fragrance Association, Washington, D.C. (1993), usually followed by a chemical name and a trademark name of a particular product. Other non-limiting examples of surfactants useful in the compositions and methods of the present invention are isotridecyl alcohol tri-ethoxylate (Surfonic.RTM. TDA-3B, Huntsman Corp.), C.sub.9-C.sub.11 pareth-6 [polyethylene glycol ether of mixed synthetic C.sub.9-C.sub.11 fatty alcohols having an average of 6 moles of ethoxalate; Neodol.RTM. 91.6], C.sub.11-C.sub.15 pareth-59 [polyethylene glycol ether of mixed synthetic C.sub.11-C.sub.15 fatty alcohols having an average of 59 moles of ethoxalate; Tergitol.RTM. 15-S-59], nonoxynol-6 [polyethylene glycol (6) nonylphenyl ether; Tergitol.RTM. NP-6], nonoxynol-9 [polyethylene glycol (9) nonylphenyl ether; Tergitol.RTM. NP-9], and a modified alkanolamide alkanolamine [Monamine.RTM. 1255], as well as other surfactants known to those of skill in the art.

This invention solves the volume problem of polystyrene foam materials and allows the easy and inexpensive shipment of the foam materials after cost effective reduction in volume by use of certain liquid aliphatic dibasic esters. The materials used in the LVP-DBE composition comprise dimethyl glutarate, dimethyl adipate and dimethyl succinate (with the proviso that the dimethyl succinate is in weight percentage amounts of 1% and less), which are effective foam reduction agents. While they have activity individually, as mixtures of dimethyl glutarate and dimethyl adipate with dimethyl succinate in weight percentage amounts of 1% and less, the action is especially favorable. Moreover, with the addition of small amounts of heat to the process, the overall effectiveness of the LVP-DBE composition is increased while having little effect on the cost of recycling. In particular, when heat is added to the process the speed of reduction of the polystyrene foam or expanded polystyrene (EPS) is increased. The heat can be introduced by several methods, for example, and not by way of limitation, heating the mixture by use of a drum heater or an inline heating element delivering the LVP-DBE or LVP-DBE mixture will dramatically the increase rate of reduction by up to three (3) to five (5)-fold but not to exceed twenty fold. Also, because of the lower boiling points of the individual reactants, very little reactant is lost in the heating process. The lower boiling points and benign nature of the reactants makes the reactant process safer than previously known and commercially used chemical reactants with higher boiling points.

The use of the aforementioned active LVP-DBEs assist in making the expanded or foamed polystyrene materials easier to reduce, collapse and/or reprocess. The polystyrene foam bead or pumpable polygel product of this process is solvatable. The polystyrene foam bead product can also be made pumpable and can then be filtered and reprocessed or injected into furnaces where the high fuel value of the material offers considerable energy savings for users and/or recyclers. If filtered and recycled, high quality polystyrene raw material bead product can be made. In particular, both the standard DBE and LVP-DBE produce high quality beads. This is a function of the Styro Solve recycling system previously implemented by Katz et al., the contents of which are specifically incorporated by reference in their entirety. By using the LVP-DBE of the present invention, the polygel so produced and transported to the plant has proven to be more consistent than that produced using standard DBE. Since the LVP-DBE used in the methods of the present invention has a lower vapor pressure, it is noted that less evaporation occurs on route to the processing plant and hence one receives a more constant polygel product. This also translates into less solvent being used in the polystyrene reprocessing center. Moreover, by using less solvent to produce the correct viscosity for recycling, one also reduces the time and energy required in the process. This results in a more cost effective and cost efficient polystyrene foam recycling process.

Heretofore, it has been impossible to cost effectively recycle polystyrene high quality raw post consumer material. High quality recycling is important in polystyrene recycling where the recycled product is desirable to be used in the food packing industry. The food packing industry has strict requirements for parts per million of contaminants in the polystyrene used, the contents of which are specifically incorporated by reference in their entirety. The process disclosed herein is the only known recycling process that is both cost effective and yields recycled material that meets the requirements of the food packing industry while still satisfying the low vapor pressure criteria established by the California Air Resources Board for volatile organic compounds in consumer products per California Code of Regulations, Title 17, Division 3, Chapter 1, Subchapter 8.5, Article 2, Section 94508(a) 80(A) and meets the exemption criteria for consumer products per EPA 40CFR59.203(f)1, the entire contents of which are incorporated herein by reference.

Furthermore, the process of volume reduction of polystyrene foam has been previously hampered by high loss due to evaporation. The use of the novel composition of the present invention helps cure this problem by employing polystyrene foam reduction agents comprising LVP-DBEs that exhibit one or more of the following characteristics: (a) a significantly lower vapor pressure than standard DBE, (b) the distillation range of the solvent is narrower, (c) chemically more stable than standard DBE, (d) that is incompatible or can react with, inter alia, strong oxidizers, acids, alkalies, etc., (e) that will not undergo polymerization, (f) that reduces foamed or expanded polystyrene at a rate of action that equals or exceeds that of standard DBE, (g) that exhibits a greater holding capacity than standard DBE, (h) that exhibits a higher flash point than standard DBE, (i) that has a relatively low odor compared to standard DBE; (j) that is not regulated as a hazardous material by DOT, IMO, or IATA, and (k) for which none of the components present in the LVP-DBE composition are listed by IARC, NTP, OSHA or ACGIH as a carcinogen.

The materials used in this method of polystyrene foam volume reduction are also recoverable by removal in the recycling process and the majority of compounds used can be easily separated from moisture and volatile organics by a combination of decanting, mutual solubility with other organic compounds and thermal stripping. The materials are further environmentally non-toxic.

The development of this invention began with identification of the unexpected affinity of the vapors of certain solvents found in perfumes. Identification of the active agent in the process became the key to the initial polystyrene foam volume reduction process. This material identified was d-limonene. D-limonene vapors acted upon the polystyrene foam and rapidly reduced the volume. The sorption process, when there was sufficient vapor present, was one that continued until the polystyrene foam was reduced to a viscous liquid. This aggressive mutual solubility was relatively fast as long as there is a presence of the needed vapors.

This invention furthers the concept of foam reduction by the further discovery of a set of chemicals which are as effective as the vapor process noted with d-limonene but which work in a liquid state and thus avoids the need for a vapor saturated atmosphere around the collapsing foam. The inventor's prior work focused on the combined use of non-low vapor pressure dimethyl glutarate and dimethyl adipate, and dimethyl succinate (CAS #119-40-0; CAS #627-93-0; CAS #106-65-0, respectively) which are effective polystyrene foam reduction agents. The present invention furthers this prior discovery in that only LVP-DBEs are employed as effective polystyrene foam reduction agents. The use of dimethyl succinate (CAS #106-65-0) in weight percentage amounts greater than 1% is specifically excluded from the scope of this invention.

This invention discloses the new combination of chemicals that have not previously been considered for this purpose since they are not easy to use in the vapor phase. This new low vapor pressure dibasic ester combination of dimethyl glutarate and dimethyl adipate with dimethyl succinate present in weight percentage amounts of 1% and less eliminates much of the loss of the LVP-DBE reagents and further improves fire safety of the recycling or foam reduction process. The extra factor is the removal of the vapor requirement with discovery of liquid phase foam reduction agents. Importantly, by lowering the vapor pressure and lowering the loss of the LVP-DBE, the final stage of the reprocessing (recycling) is completed in a much more efficient manner. More importantly, this new method of recycling polystyrene foam using LVP-DBE now falls under the new California Code of Regulations, Title 17, Division 3, Chapter 1, Subchapter 8.5, Article 2, Section 94508 (a) 80(A) vapor-pressure EPA standards, the entire contents of which are incorporated herein by reference, thereby allowing the product to be used whereas the current standard DBE can not. Also, as noted supra, use of the LVP-DBE allows the polygel to be more safely transported to the recycling plant since there is less vapor pressure and thus, less evaporation of the LVP-DBE.

The formulas used for this invention consist of esters, specifically dibasic esters. These esters, especially the aliphatic dibasic esters such as dimethyl glutarate and dimethyl adipate (CAS #119-40-0 and CAS #627-93-0, respectively) have rapid reaction with polystyrene foams (both foamed and expanded), again acting as a stress cracking agent to destroy the cell wall webs which are highly stressed, then destroying the intercellular structure that remains. In addition, through experimentation that is the subject of the invention disclosed herein it was learned that the esters themselves were effective reactants when small amounts of heat were added to the process. Esters have been disclosed in a U.S. patent to Shiino et al. U.S. Pat. No. 5,629,352. However, that disclosure does not teach nor contemplate heating. The addition of small amounts of heat to the LVP DBE ester composition of the present invention prior to its use as a reactant greatly increases is reactant characteristics. The presence of esters without heat will reduce foam but in a time period that is not efficient for recycling purposes.

The dibasic or dialkyl esters disclosed herein above are not like the vapor processes used previously for foam reduction, which attack polystyrene foam by dissolving the polystyrene foam in the vapors of natural organic compounds. The present dibasic ester chemicals act as liquids. The dibasic esters have boiling points of 196 to 225° C., with a vapor pressure of only 0.2 mm Hg at 20° C. while the vapor pressure for LVP-DBE is only 0.02 Hg @ 20° C. They have an evaporation rate one tenth that of butyl acetate (Vapor pressure: 8 mm Hg at 20° C.), a common reference. Should the evaporation read from one fortieth for standard DBE (vapor pressure of 0.2 mm Hg@20° C.) and one four hundredth for LVP-DBE (vapor pressure of 0.02-0.04 mm Hg @ 20° C.). The specific gravity is slightly greater that water and mutual solubility is limited, allowing easy separation from water mixes. The dibasic esters also have low solubility in water and very high solubility in many alcohols so that separation schemes for recovery of the dibasic mix is feasible. The use of the dibasic esters, especially as a mixture, eliminates the large loss due to evaporation of the d-limonene used as the reducing agent in previous polystyrene foam reduction and recovery methods. The evaporation of active agents had previously made the process partly ineffective in many applications because of cost. The present invention is cost effective since this loss is very low.

The active agents also have several key property requirements or needs. Since the active agents will ultimately be placed into trash and garbage dumps, they must be environmentally safe and sound. Ideally, the active agents should not be within a range of boiling points and vapor pressures that will either immediately flash off or will over time evaporate to form a vapor layer within a landfill. With respect to solvents, which attack polystyrene foams, nearly all solvents are environmental problem chemicals. One class of chemicals broadly noted as isoprenoid and terpene compounds contain mostly environmentally safe naturally derived compounds, but most of these compounds are relatively volatile and would at least form a vapor layer in a landfill dump situation. The dibasic esters of this invention are of sufficiently low volatility that they do not form an indump/landfill vapor layer. This removes future problems of large vapor escape if the dump/landfill top impermeable layers are destroyed or damaged by man made or natural phenomena such as, inter alia, earthquakes.

In the prior patents on activation (for example, U.S. Pat. No. 5,223,543) the emphasis was on d-limonene. This reduction agent was selected for cost and volatility reasons since prior uses in the field relied on rapid action due to application in exposed areas as activated liquid. The use of a variety of liquid volatilities as long as vapor is generated over an extended time ranging from several hours to several days is also contemplated herein. The present use of esters with small amounts of heat, dibasic esters, and d-limonene in combination with esters and dibasic esters, as foam reduction agents is also effective and is specifically contemplated herein. The present invention is vastly superior compared to the use of standard DBE in creating a vast reduction in the vapor loss, in preventing vapor layers within garbage or landfill disposal dumps, in reduction of loss in reprocessing operations, which are typically at temperatures of over 270° C. Also, the present invention limits reliance on d-limonene, which can experience unstable pricing and is not easily reclaimed after recycling.

Finally, all of the contemplated reactants described herein may be optionally aided in their reactant effectiveness by including in the reactant process a pretreatment shredding or grinding of the polystyrene. The shredding can be effectively accomplished through the use of a hopper that shreds the polystyrene in the first stage of the process. The second stage of the process would have the shredded polystyrene being treaded with one of the disclosed reactants in a holding compartment of the hopper. The resultant foam sludge could then be pumped from the hopper to containers for transportation to waste or recycling locations.

In one embodiment, a mixture of a dibasic esters comprising dimethyl glutarate, dimethyl adipate, and dimethyl succinate with the dimethyl succinate being present in weight percentage amounts of 1% and less; and a surfactant, are sprayed onto pre-shredded polystyrene foam waste. In another embodiment, a mixture of a dibasic esters comprising dimethyl glutarate, dimethyl adipate, and dimethyl succinate with the dimethyl succinate being present in weight percentage amounts of 1% and less, are sprayed onto pre-shredded polystyrene foam waste in the absence of a surfactant.

Examples of foam waste that can be reduced using the compositions and methods of the present invention can be from a variety of sources that include, for example, and not by way of limitation, foam serving plates and containers in a fast food restaurant, the residues of packing for food or industrial objects (representative non-limiting examples of foamed or expanded polystyrene that can be reduced using the methods of the present invention include, inter alia, computer end caps, packaging expanded polystyrene (EPS) peanuts, insulation board, Styrofoam®, construction forms, coffee cups, egg cartons, drink cups, meat trays, vegetable trays, protective packaging, furniture, lamps, lamp shades, paintings, appliances such as refrigerators, stove dish washers, microwave ovens, cameras, VCRs, TVs, telephones, vacuums, radios, chemical packaging military applications for pollution prevention items such as: munitions packaging, target drones, weapons, food service, agriculture; seedling trays, various industries such as tobacco growers, greenhouses (for their seeding trays) plant growers for their planting, fruit and vegetable growers for their shipping containers; foam coolers, fish containers, among others. The foam waste would be shredded in a hopper. The shreds of polystyrene foam would be contained in a compartment of the hopper. The reactant would be sprayed onto the shredded foam waste. The spray and shredded foam combination will rapidly decrease in volume as the foam collapses and would result in the forming of foam sludge and volume of reducing agent. The sludge and reducing agent would be pumped from the hopper compartment into drum type containers and sent to dumps where it occupies a greatly reduced volume or sent to a reprocessor to recover the active agent dibasic esters and the polystyrene polymer. Preferably the reducing agent is ninety percent dibasic ester and not to exceed 10 percent surfactant.

The process is preferably the same as described above with alternate reactant compositions. However, the embodiments contemplated herein are not limited to the pre shredding of the foam waste, the use of a hopper, the pumping of the foam sludge and reactant or the use of drum-like containers for transporting the foam sludge and reactant. Indeed, the embodiments contemplated herein may be used in conjunction with other processing methods of polystyrene foam waste known to those of skill in the art.

In a second embodiment, the reactant is at least one of the three named dibasic esters which is combined with d-limonene; and a surfactant, whereby the reactant in a liquid state contacts polystyrene foam causing the collapse of the polystyrene cell to form a compact polystyrene gel material that is easily shippable. Preferably the reactant, or foam reduction agent, is eighty eight weight percent of the dibasic ester, ten percent d-limonene and two percent of the surfactant. In addition, it is preferred that the surfactant is at least one of an industry standard surfactant known as NP5 and NP9. Other non-ionic surfactants know to those of skill in the art can be used in conjunction with the DBE and LVP-DBE compositions of the present invention.

In a third embodiment, the reactant is a dibasic esters that is at least one of the group of dimethyl glutarate, dimethyl adipate, and dimethyl succinate, with the dimethyl succinate being present in weight percentage amounts of 1% and less; d-limonene; and, a vegetable oil are used as the reducing agent whereby the reactant in a liquid state contacts the polystyrene foam causing the collapse of the polystyrene cell to form a compact polystyrene gel material that is shippable. Preferably, the reactant, or foam reduction agent, is fifty five percent vegetable oil, thirty percent dibasic ester and fifteen percent d-limonene. It is also preferred that the vegetable oil is soy oil. Other examples of preferred oils include, for example, and not by way of limitation, oils from celery and olives.

All of the embodiments described above are sprayed onto polystyrene foam. The preferred process is to have the polystyrene foam placed into a hopper wherein the foam is converted to small pieces that can be combined with the reducing agent. The resulting material, sludge and reducing agent are pumped from the hopper to drums for transportation. In another aspect, the process involves the use of a novel mechanical device that is to be the subject of another application by the inventors.

EXAMPLES

It will be understood by one of ordinary skill in the relevant arts that other suitable modifications and adaptations to the methods and applications described herein are readily apparent from the description of the invention contained herein in view of information known to the ordinarily skilled artisan, and may be made without departing from the scope of the invention or any embodiment thereof. Having now described the present invention in detail, the same will be more clearly understood by reference to the following examples, which are included herewith for purposes of illustration only and are not intended to be limiting of the invention.

The embodiments described herein are not a limitation to invention disclosed by this application but are shown to illustrate the best methods and uses of the invention. Further uses would be obvious to those skilled in the art by a complete review of the disclosure made herein.

Example 1

Determination of the exposure limits of the LVP-DBE agents used in the novel polystyrene foam reduction recycling system

Exposure Limits

DBE-LVP
PEL (OSHA): None Established
TLV (ACGIH): None Established
AEL*: 1.5 ppm, 10 mg/m3, 8 Hr. TWA

*AEL is DuPont Chemical Inc.'s Acceptable Exposure Limit. Where governmentally imposed occupational exposure limits which are lower than the AEL are in effect, such limits shall take precedence.

Example 2

Determination of the physical and chemical properties of the LVP-DBE agents used in the novel polystyrene foam reduction recycling system

Physical and Chemical Properties

Odor: Sweet
Form: Liquid
Specific Gravity: 1.1@20 C (68)
Boiling Point: 210-225 C (410-437 F)
Vapor Pressure: 0.02-0.04 mm Hg @ 20 C (68 F)
Melting Point: −13 to 8 C (9-46 F)
% Volatiles: 100 WT % @ 20 C (68 F)
Evaporation Rate: <0.1 (Butyl Acetate=1.0)
Solubility in Water: 2.5-4.2 WT %@20 C (68 F)

Example 3

Determination of the exposure guidelines of the LVP-DBE agents used in the novel polystyrene foam reduction recycling system

Exposure Guidelines

Exposure Limits
DBE-LVP
PEL (OSHA): None Established
TLV (ACGIH): None Established
AEL*: 1.5 ppm, 10 mg/m3, 8 Hr. TWA
This limit is for DBE.

*AEL is DuPont's Acceptable Exposure Limit. Where governmentally imposed occupational exposure limits which are lower than the AEL are in effect, such limits shall take precedence.

Example 4

Determination of the hazardous chemical indicators of the LVP-DBE agents used in the novel polystyrene foam reduction recycling system

Hazardous Chemical Lists

SARA Extremely Hazardous Substance: No
CERCLA Hazardous Substance: No
SARA Toxic Chemical: No
DBE-LVP is considered 100% VOC (1080 g/l) per EPA 40 C.F.R. Section 51.100(s)1.
DBE-LVP meets the VOC exemption criteria for consumer products per EPA 40 C.F.R. Section 59.203(f)1.
DBE-LVP meets the low vapor pressure (LVP) criteria established by the California Air Resources Board for volatile organic compounds in consumer products per California Code of Regulations, Title 17, Division 3, Chapter 1, Subchapter 8.5, Article 2, Section 94508(a)80(A).

Canadian Regulations

CLASS D Division 2 Subdivision B—Toxic Material. Skin or Eye Irritant.

Equivalents

The invention illustratively described herein suitably may be practiced in the absence of any element or elements, limitation or limitations which is not specifically disclosed herein. Thus, for example, in each instance herein any of the terms "comprising," "consisting essentially of," and "consisting of" may be replaced with either of the other two terms. The terms and expressions that have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed herein, optional features, modification and variation of the concepts herein disclosed may be resorted to by those skilled in the art, and that such modifications and variations are considered to be within the scope of this invention as defined by the appended claims. In addition, where features or aspects of the invention are described in terms of Markush groups, those skilled in the art will recognize that the invention is also thereby described in terms of any individual member or subgroup of members of the Markush group.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein. Other aspects of the invention are within the following claims.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A method of reducing a volume of polystyrene foam comprising the steps of: (a) providing polystyrene foam; and (b) spraying upon said polystyrene foam a solution comprising: (i) one or more low vapor pressure dibasic esters so as to form a gel-like substance which may be recycled into polystyrene foam.

2. A method of reducing a volume of polystyrene foam comprising the steps of: (a) providing polystyrene foam; and (b) spraying upon said polystyrene foam a solution comprising: (i) one or more low vapor pressure dibasic esters; and (ii) one or more surfactants so as to form a gel-like substance which may be recycled into polystyrene foam.

3. A method of reducing a volume of polystyrene foam comprising the steps of: (a) providing polystyrene foam; and (b) spraying upon said polystyrene foam a solution comprising: (i) one or more low vapor pressure dibasic esters; so as to form a gel-like substance which may be applied to one or more object or materials as a waterproofing agent, a paint stripper, as a graffiti remover, as an extender of the life of concrete, as an adhesive remover, as a stain remover, as a scuff mark remover, as a general degreaser, or recycled into polystyrene foam.

4. A method of reducing a volume of polystyrene foam comprising the steps of: (a) providing polystyrene foam; and (b) spraying upon said polystyrene foam a solution comprising: (i) one or more low vapor pressure dibasic esters; and (ii) one or more surfactants; so as to form a gel-like substance which may be applied to one or more object or materials as a waterproofing agent, a paint stripper, as a graffiti remover, as an extender of the life of concrete, as an adhesive remover, as a stain remover, as a scuff mark remover, as a general degreaser, or recycled into polystyrene foam.

5. A method of reducing a volume of polystyrene foam as recited in any one of claims 1-4, further comprising the step of heating said solution containing said polystyrene foam to reduce the reduction time.

6. A method of reducing a volume of polystyrene foam as recited in any one of claims 1-4, further comprising the step of separating said gel-like substance from said solution so that said gel-like substance may be applied externally to said object or mixed with said materials to increase said object's or said material's waterproofing agent's characteristics, paint stripper's characteristics, graffiti remover's characteristics, extender of the life of concrete's characteristics, adhesive remover's, stain remover's characteristics, scuff mark remover's characteristics, and/or general degreaser's characteristics, or any combination thereof, or increase the recyclability of the gel-like substance into polystyrene foam.

7. A method of reducing a volume of polystyrene foam as recited in any one of claims 1-4, wherein said solution further comprises d-limonene.

8. A method of reducing a volume of polystyrene foam as recited in any one of claims 1-4, wherein said solution further comprises one or more vegetable oils.

9. A method of reducing a volume of polystyrene foam as recited in claim 8, wherein said vegetable oil is a soybean oil.

10. A method of reducing a volume of polystyrene foam as recited in claim 8, wherein said solution further comprises d-limonene.

11. A method of reducing a volume of polystyrene foam as recited in claim 10, further comprising the step of separating said gel-like substance from said aqueous solution so that said gel-like substance may be applied externally to said object or mixed with said materials to increase said object's or said material's waterproofing agent's characteristics, paint stripper's characteristics, graffiti remover's characteristics, extender of the life of concrete's characteristics, adhesive remover's, stain remover's characteristics, scuff mark remover's characteristics, general degreaser's characteristics, or increase the recyclability of the gel-like substance into polystyrene foam, or any combination thereof.

12. A method of reducing a volume of polystyrene foam comprising the steps of: (a) providing polystyrene foam; and (b) applying to said polystyrene foam an aqueous solution comprising: (i) a vegetable oil; and (ii) a surfactant; to form a gel-like substance which may be applied to one or more objects or materials as paint stripper, as a graffiti remover, as a waterproofing agent, as an extender of the life of concrete, as an adhesive remover, as a stain remover, as a scuff mark remover, as a general degreaser, or recycled into polystyrene foam.

13. A method of reducing a volume of polystyrene foam as recited in claim 12, further comprising the step of heating said solution containing said polystyrene foam to reduce the reduction time.

14. A method of reducing a volume of polystyrene foam as recited in claim 12, further comprising the step of separating said gel-like substance from said solution so that said gel-like substance may be applied externally to said object or mixed with said materials to increase said object's or said material's waterproofing agent's characteristics, paint stripper's characteristics, graffiti remover's characteristics, extender of the life of concrete's characteristics, adhesive remover's, stain remover's characteristics, scuff mark remover's characteristics, general degreaser's characteristics, increase the recycleability of the gel-like substance into polystyrene foam, or any combination thereof.

15. A method of reducing a volume of polystyrene foam as recited in claim 12, wherein said vegetable oil is a soybean oil.

16. A method of reducing a volume of polystyrene foam as recited in claim 12, wherein said solution further comprises d-limonene.

17. A method of reducing a volume of polystyrene foam as recited in claim 16, further comprising the step of separating said gel-like substance from said solution so that said gel-like substance may be applied externally to said object or mixed with said materials to increase said object's or said material's waterproofing agent's characteristics, paint stripper's characteristics, graffiti remover's characteristics, extender of the life of concrete's characteristics, adhesive remover's, stain remover's characteristics, scuff mark remover's characteristics, general degreaser's characteristics, increase the recycleability of the gel-like substance into polystyrene foam, or any combination thereof.

18. A method of reducing a volume of polystyrene foam comprising the steps of: (a) providing polystyrene foam; and (b) applying to said polystyrene foam a solution comprising: (i) a low vapor pressure dibasic ester; and (ii) a vegetable oil; to form a gel-like substance which may be applied to one or more objects or materials as a waterproofing agent, a paint stripper, as a graffiti remover, as an extender of the life of concrete, as an adhesive remover, as a stain remover, as a scuff mark remover, as a general degreaser, or recycled into polystyrene foam.

19. A method of reducing a volume of polystyrene foam as recited in claim 18, further comprising the step of heating said solution containing said polystyrene foam to reduce the reduction time.

20. A method of reducing a volume of polystyrene foam as recited in claim 18, further comprising the step of separating said gel-like substance from said solution so that said gel-like substance may be applied externally to said object or mixed with said materials to increase said object's or said material's waterproofing agent's characteristics, paint stripper's characteristics, graffiti remover's characteristics, extender of the life of concrete's characteristics, adhesive remover's, stain remover's characteristics, scuff mark remover's characteristics, general degreaser's characteristics, or increase the recycleability of the gel-like substance into polystyrene foam, or any combination thereof.

21. A method of reducing a volume of polystyrene foam as recited in claim 18, wherein said solution further comprises d-limonene.

22. A method of reducing a volume of polystyrene foam as recited in claim 21, further comprising the step of separating said gel-like substance from said solution so that said gel-like substance may be applied externally to said object or mixed with said materials to increase said object's or said material's waterproofing agent's characteristics, paint stripper's characteristics, graffiti remover's characteristics, extender of the life of concrete's characteristics, adhesive remover's, stain remover's characteristics, scuff mark remover's characteristics, general degreaser's characteristics, or increase the recycleability of the gel-like substance into polystyrene foam, or any combination thereof.

23. A method of reducing a volume of polystyrene foam as recited in claim 18, wherein said vegetable oil is a soybean oil.

24. A method of reducing a volume of polystyrene foam as recited in claim 23, wherein said solution further comprises d-limonene.

25. A method of reducing a volume of polystyrene foam as recited in claim 24, further comprising the step of heating said solution containing said polystyrene foam to reduce the reduction time.

26. A method of reducing a volume of polystyrene foam as recited in claim 25, further comprising the step of separating said gel-like substance from said solution so that said gel-like substance may be applied externally to said object or mixed with said materials to increase said object's or said materials waterproofing agent's characteristics, paint stripper's characteristics, graffiti remover's characteristics, extender of the life of concrete's characteristics, adhesive remover's, stain remover's characteristics, scuff mark remover's characteristics, general degreaser's characteristics, increase the recycleability of the gel-like substance into polystyrene foam, or any combination thereof.

27. A method to reduce the volume of polystyrene foams where polystyrene foam products are subject to the vapor of low vapor pressure dibasic esters in an enclosed area for a period of time until they are reduced to a gelatinous state or close to a viscous state.

28. The method of claim 27, wherein said polystyrene foams are reduced in volume by the effect of sprayed liquids containing low vapor pressure dibasic esters in addition to said vapors.

29. The method of claim 27, wherein said enclosed area is a plastic bag, drum, or any other closed container.

30. A recycling method to reduce the volume of polystyrene foams wherein said polystyrene foams are exposed to vapors of low vapor pressure dibasic esters over an extended period in a container which prevents escape of said vapors, liquid or a combination thereof.

31. The recycling method of claim 30, wherein said vapors are contained in a tank or vessel which has ports for addition of polystyrene foams, for addition of low vapor pressure dibasic esters, and for withdrawal of dissolved polystyrene or polygel.

32. The recycling method of claim 31, wherein said vapors arise from a combination of a spray of the liquid low vapor pressure dibasic esters and vapors transported from a second tank, and the polystyrene foam in its reduced state is withdrawn by flow to said second tank.

* * * * *